United States Patent [19]
Krivoshlykov

[11] Patent Number: 6,018,533
[45] Date of Patent: *Jan. 25, 2000

[54] OPTICAL FIBER AND INTEGRATED OPTIC LASERS WITH ENHANCED OUTPUT POWER

[75] Inventor: Sergej G. Krivoshlykov, Moscow, Russian Federation

[73] Assignee: Ceramoptec Industries, Inc., East Longmeadow, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/721,461

[22] Filed: Sep. 27, 1996

Related U.S. Application Data

[63] Continuation of application No. 08/426,100, Apr. 21, 1995, abandoned.

[51] Int. Cl.[7] ................................................. H01S 3/30
[52] U.S. Cl. ........................................ 372/6; 385/123
[58] Field of Search ................... 372/6; 385/123, 385/124

[56] References Cited

U.S. PATENT DOCUMENTS

| | | | |
|---|---|---|---|
| 5,013,131 | 5/1991 | Fotheringham | 385/124 |
| 5,170,457 | 12/1992 | Jen | 385/123 |
| 5,210,816 | 5/1993 | Iino et al. | 385/123 |
| 5,291,501 | 3/1994 | Hanna | 372/6 |
| 5,574,818 | 11/1996 | Krivoshlykov | 385/122 |

*Primary Examiner*—Rodney Bovernick
*Assistant Examiner*—Robert E. Wise
*Attorney, Agent, or Firm*—Bolesh J. Skutnik; B J Associates

[57] ABSTRACT

The invention describes a method of single-transverse-mode generation for waveguide lasers of various kinds having a large cross section of their active core and thus providing a possibility of efficient pump of the active core region. This results in a laser beam with enhanced power and high spatial quality for high efficiency coupling to standard single-mode optical fiber networks. It is found that a multimode waveguide having a central dip of special shape in the refractive index profile of its core is able to guide a higher order mode with sharp central peak of its field carrying the considerable part on the mode energy and whose width is well compatible with the width of the fundamental mode of standard single-mode fibers. The useful properties of this higher order mode can be employed to provide the single-transverse-mode regime of generation in optical fiber lasers, integrated optical micro-lasers and various semiconductor laser sources.

10 Claims, 7 Drawing Sheets

OPTICAL FIBER AND INTEGRATED OPTIC LASERS WITH ENHANCED OUTPUT POWER

This is a continuation of application Ser. No. 08/426,100, filed Apr. 21, 1995 now abandoned.

BACKGROUND OF THE INVENTION

1. Field of the Invention

The invention relates generally to an optical coherent radiation source, and more specifically to semiconductor lasers, fiber optic and integrated optic lasers with enhanced output power used to generate a powerful optical signal in optical fiber communication systems, sensors and other optical devices for industrial and medical applications.

2. Information Disclosure Statement

Semiconductor lasers, integrated optical and optical fiber lasers are becoming key components of optical fiber communication systems, sensors, fiber-gyros and other optical devices for various industrial and medical applications. All these lasers essentially consist of an active waveguiding core region and outer cladding with lower refractive index In the case of semiconductor lasers an electric current is used to pump the active region of p-n junction. In the case of optical fiber lasers and integrated optical lasers a rare-earth-doped optical glasses pumped with an external light source such as a single-mode semiconductor laser or diode-laser array are usually employed. Mirrors or flat end faces of the waveguide can be used to provide the system with the necessary feedback.

Most fiber lasers are based on conventional high-purity silica-based optical fibers manufactured by chemical-vapor-deposition (CVD) and are doped, for example, with such rare-earth elements as $Nd^{3+}$, $Er^{3+}$, $Tm^{3+}$, $Ho^{3+}$, $Yb^{3+}$, $Sm^{3+}$, and $Pr^{3+}$ via gas-phase or solution-doping processes. The same materials can be used in integrated optical lasers based on planar waveguiding structures.

Single-mode active fibers or waveguides are usually used in these lasers because they can easily be integrated into single-mode fiber-communication and sensor networks. Primary disadvantage of such single-mode fiber or integrated optical lasers is the difficulty of coupling the pump light from a diode laser array into the active waveguide core region whose cross section is not much larger than the wavelength of the pump light. Even using a diffraction-limited semiconductor laser as the pump source fails to alleviate the problem due to the laser's low output power. The pump light from semiconductor sources usually couples into a highly multimode doped cladding region which guides the pump radiation. Thus, amplification of the light takes place only in a single-mode rare-earth-doped core while a considerable portion of the mode field propagates in the passive cladding region.

The problem of coupling pump light into an active waveguide core can be solved, however, by using larger core sizes, i.e. multimode waveguide lasers. Such multimode waveguide lasers guiding large amount of transverse modes are expected to be much more powerful because of the more efficient pumping of their active core and more efficient utilization of the pump power. The mirror-coating-damage problem can be solved as well by using larger core sizes as found in multimode active waveguides.

Directly employing the multimode active waveguide instead of a single mode one does not solve the problem, since an interference of all the waveguide modes results in a complicated speckle pattern at the laser output mirror destroying in such a way the quality of the output laser beam and drastically reducing the efficiency of coupling of this beam into an output single-mode fiber network. Moreover, in the case of semiconductor lasers the generation of many transverse modes results also in an undesired increase in threshold of the pump current. Therefore, it is desirable to have a possibility to provide a single-mode regime of operation of the laser having a large cross section of the active core required for its efficient pumping.

OBJECTS AND SUMMARY OF THE INVENTION

It is an object of the present invention to provide a method for single-transverse-mode operation for waveguide lasers of various kinds having a large active core cross section enabling efficient pumping and which overcomes the above mentioned difficulties.

Another object of the invention is to specify a construction of an active multimode waveguide with a special core refractive index profile guiding a higher order mode having sharp peak of its field in the central region of the fiber core.

It is a further object of the invention to describe a construction of single-transverse-mode laser with large cross section of its active core region.

Other object of the invention is to provide a method of effective light coupling between a beam generated by this laser and a single-mode output network.

Still another object of the invention is to provide examples of some lasers that can be fabricated using the proposed technology.

Briefly stated, the present invention describes a method of single-transverse-mode generation for waveguide lasers of various kinds having a large cross section of their active core and thus providing a possibility of efficient pump of the active core region. This results in a laser beam with enhanced power and high spatial quality for high efficiency coupling to standard single-mode optical fiber networks. It was discovered that a multimode waveguide having a central dip of special shape in the refractive index profile of its core is able to guide a higher order mode with a sharp central peak of its field whose width is well compatible with the width of the fundamental mode of standard single-mode fibers. The useful properties of this higher order mode can be employed to provide the single-transverse-mode regime of generation in optical fiber lasers, integrated optical micro-lasers and various semiconductor laser sources.

The above, and other objects, features and advantages of the present invitation will become apparent from the following description read in conjunction with the accompanying drawings, in which like reference numbers in different drawings denote like items.

DESCRIPTION OF PREFERRED EMBODIMENTS

In order to achieve the goal of this invention, a single-transverse-mode regime of generation in the waveguide laser having large cross section of its active core, we have investigated field configurations for the transverse modes in a multimode waveguide having various shapes of its core refractive index profile. It has been found that in the case of a waveguide, having refractive index profile with a dip minimum in a center region, planar waveguides, rib waveguides and optical fibers with a circular cross section, can guide a specific type of higher order mode whose field, while filling the whole cross section of the waveguide, has a sharp peak in the waveguide's central region. The central mode field peak carries a considerable part of the mode energy and its width can be controlled and matched to the width of the fundamental mode of a standard single-mode output network, if required.

Figure 1A:
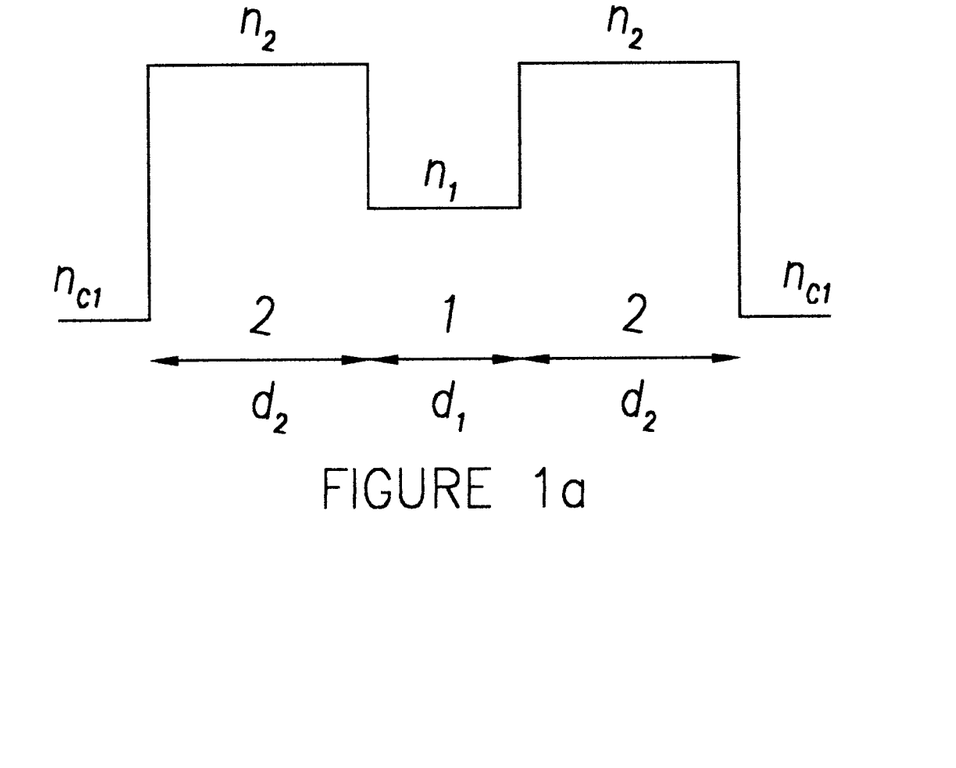
FIG. 1(a) shows a schematic view of the refractive index profile for the multimode optical waveguide having a central dip in its core region.
Figure 1B:
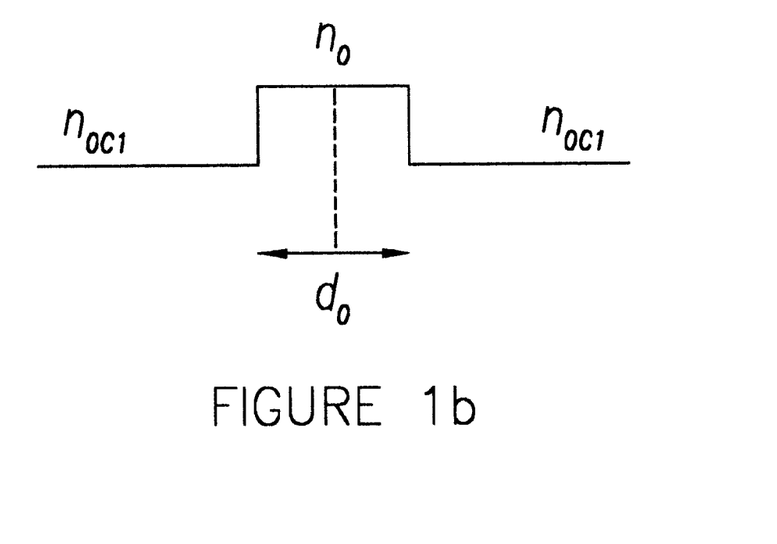
FIG. 1(b) shows a schematic view of the refractive index profile for a typical single-mode optical waveguide.

An example of a multimode planar waveguide with such a compound refractive index profile is schematically shown in FIG. 1(a). In this preferred embodiment it is constructed in the following way. The width $d_1$ and refractive index $n_1$ of the dip in the central region of the fiber core have been chosen to be equal to the width $d_0$ and refractive index $n_0$ of typical single-mode waveguide as well as the refractive index of the cladding $n_{cl}=n_{0cl}$, as shown in FIG. 1(b). There are quite a number of technologies available that can be used to fabricate the waveguide with such a refractive index profile. For example, in the case of active optical fiber waveguide one can draw such a fiber from a preform fabricated using the method of plasma chemical vapor deposition. Refractive index of typical single-mode fiber is also shown in FIG. 1(b) for comparison. Outer region of the core of the multimode fiber in FIG. 1(a) has much higher refractive index $n_2>n_1>n_{cl}$ and much larger size $d_2>d_1$ than its central region providing in such a way a multimode regime of operation of the whole core of the compound waveguide. Optimization of the compound refractive index profile in order to obtain the desired field configuration in the resulting waveguide can be performed numerically using standard software for evaluation on the mode fields in corresponding slab, rib or fiber waveguides which is available on the market.

Figure 2A:
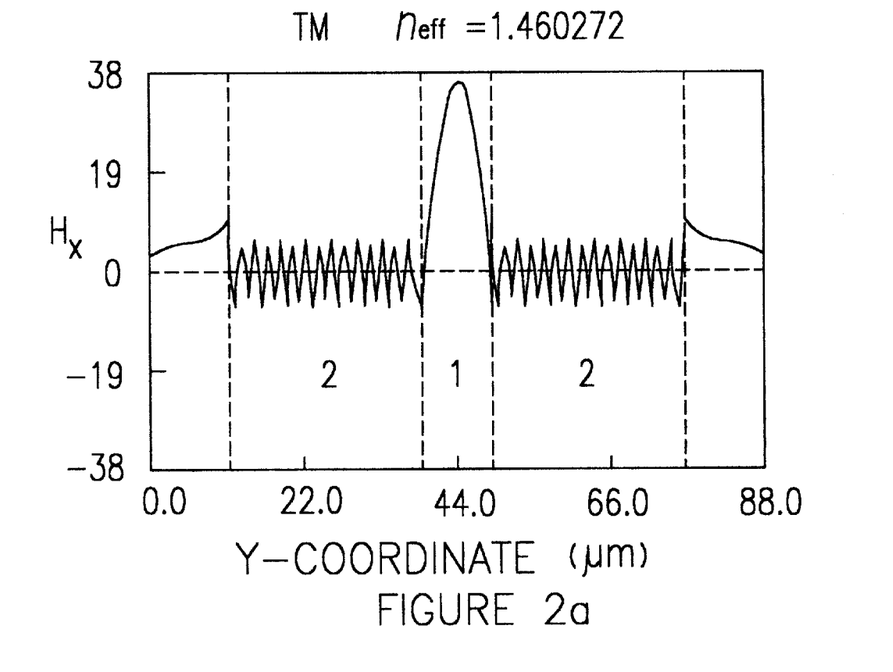
FIG. 2(a) shows a field profile for the higher order mode with a sharp peak having a maximum in its central region.
Figure 3A:
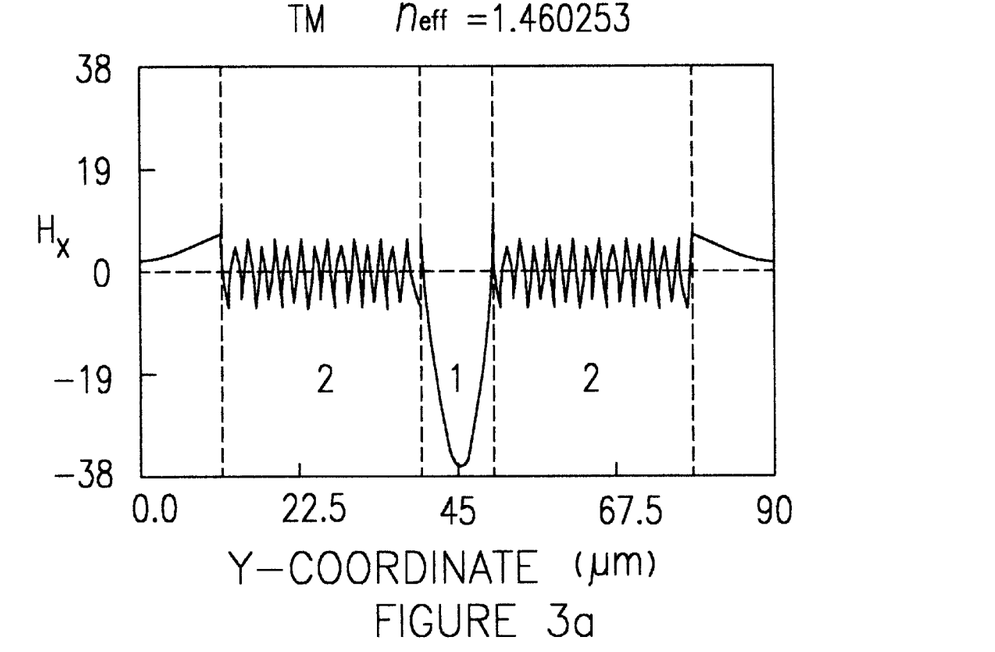
FIG. 3 shows typical field profiles for the higher order mode with sharp peak having a minimum in its central region.
Figure 3B:
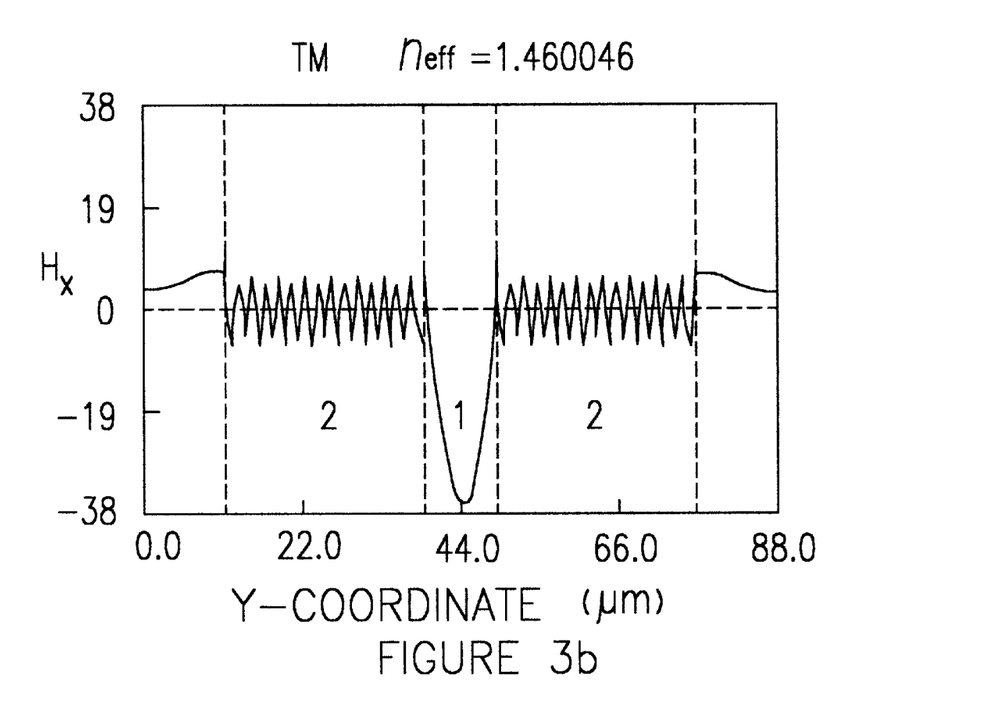

For example, the field configuration of a higher order mode in the compound slab waveguide having a sharp central peak of its field is shown in FIG. 2(a) in the case when the wavelength of radiation $\lambda=1.55$ μm, $n_{cl}=n_{0cl}=1.460$, $n_1=n_0=1.463$, $d_1=d_0=8$ μm and $d_2=30$ μm, $n_2=1.65$. A physical reason for origin of such a higher order mode having sharp peak of its field in the central region of the waveguide can be explained as follows. It is known that the intensity of mode field increases at the interface between the waveguide and a medium with lower refractive index. Therefore, two symmetric higher order modes corresponding to the right and to the left parts of compound waveguide profile shown in FIG. 1(a) and having refractive indices $n_2$ have sharp peaks (either maximum or minimum) of their fields just in the central region of the waveguide. By choosing a specific waveguide thickness $d_2$ and refractive index $n_2$, a constructive interference of these two modes results in the desired higher order mode of whole compound waveguide having a sharp peak in the waveguide center as shown in FIG. 2(a). FIG. 3 shows two typical mode field configurations having sharp peak with minimum of their fields in the central region for different combination of the waveguide parameters. FIG. 3(a) corresponds to the case $\lambda=1.55$ μm, $n_{cl}=1.460$, $n_1=1.463$, $d_1=8$ μm, $n_2=1.65$ and $d_2=31$ μm, while FIG. 3(b) corresponds to the case $\lambda=1.55$ μm, $n_{cl}=1.460$, $n_1=1.463$, $d_1=8$ μm, $d_2=30$ and $n_2=1.686$. In all the cases shown either in FIG. 2(a) or FIG. 3 the width of central peak of the field can be adjusted by changing the refractive index $n_1$ and thickness $d_1$ of the central region of the waveguide.

Figure 2B:
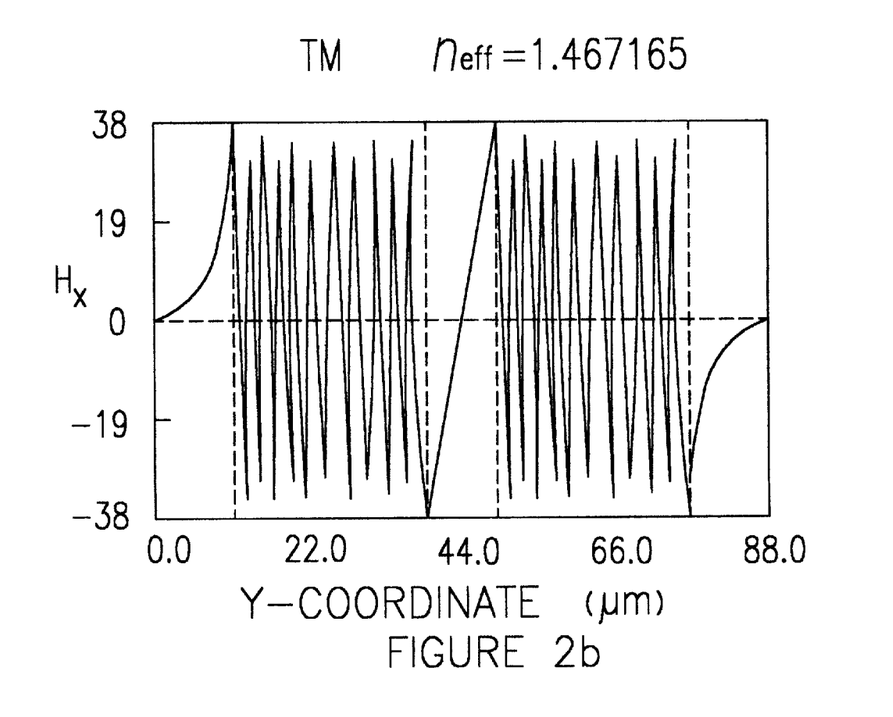
FIG. 2(b) shows a field profile for typical higher order mode without the sharp peak in its central region.
Figure 4:
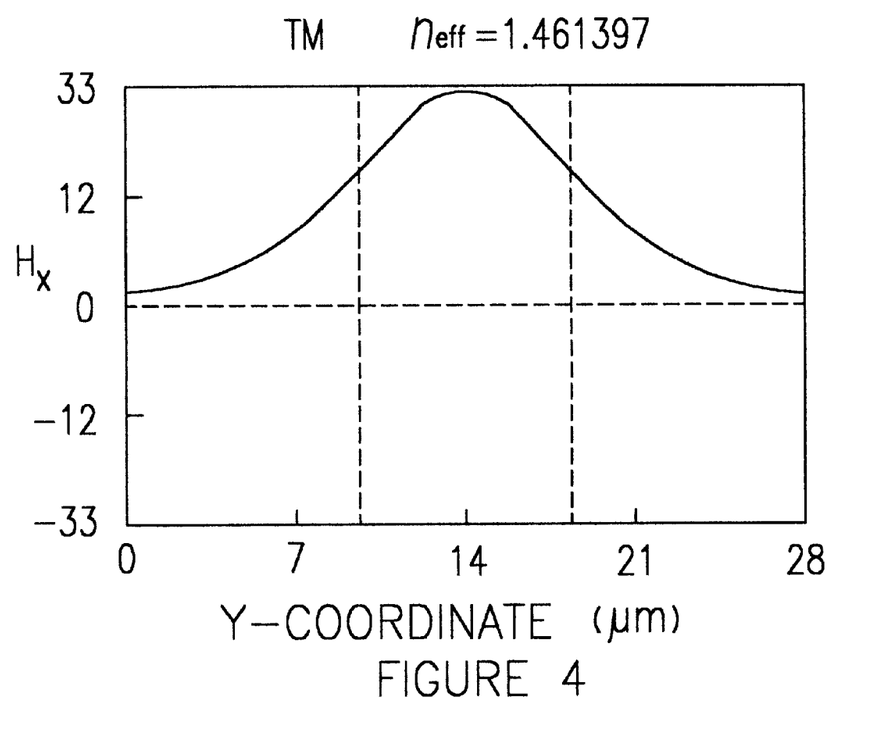
FIG. 4 shows a field of the fundamental mode in typical single-mode optical waveguide.

A typical field configuration of other higher order modes which do not have a peak of the field in the central region of the waveguide is shown in FIG. 2(b). The field of these modes are mostly concentrated in the outer regions of the waveguide core having higher refractive index $n_2$. Using an appropriate aperture in the central region of the waveguide it is possible to select the field corresponding to the central peak of desired mode while filtering all other higher order modes. Computer generated holograms can also be employed for selection of the field of one specific mode. Connection of the compound waveguide with some single-mode output waveguide provides another possibility for selection of the field corresponding to the central peak of the mode. A field of the fundamental mode in a single-mode waveguide with the same values of parameters $\lambda=1.55$ μm, $n_{0cl}=1.460$, $n_0=1.463$ and $d_0=8$ μm is shown in FIG. 4 for comparison. One can see that by appropriate adjusting the width of the compound waveguide $d_1$ it is possible to match the width of central peak of the field in FIG. 2(a) to the width of the fundamental mode in FIG. 4 to maximize an overlap integral between these two fields providing in such a way maximum coupling efficiency to the single-mode output waveguide. Moreover, the mode field configurations in the compound multimode waveguide shown in FIG. 2(a) and in FIG. 3 keep their shapes while changing the width of the central peak of the mode field up to the value of the core central region as large as $d_l=15$ μm. In the case of a single-mode waveguide shown in FIG. 4 the single-mode regime of operation breaks down at the value $d_1>8.2$ μm. Thus, the multimode waveguide of this invention is able to guide a single-mode-like higher order mode with sharp peak even when width $d_1$ of the dip of its core profile twice as large as the width of the core of the single-mode waveguide.

The profile optimization process of the mode field may be different for different types of optical waveguides (planar, rib waveguides, optical fibers waveguiding structure in semiconductor lasers) and it obviously depends on each specific application of the waveguide and each specific output mode field configuration to be obtained. Therefore, one specific example given above does not restrict all other possible applications of the mode field configuration with sharp central peak proposed.

One of the most important applications the described properties of higher order mode configuration with sharp central peak can find in waveguide lasers. Such a mode field filling whole volume of an active waveguide has larger gain coefficient resulting from a possibility to pump the core of multimode compound waveguide more effectively then smaller core of standard single-mode waveguide, while good quality of the output beam is provided by the selection of the central peak of the mode field. Moreover, this selection procedure can be used to realize feedback conditions just for this one specific mode of the multimode waveguide providing in such a way conditions for generation of one specific higher order mode in the laser. The feedback can easily be realized in a standard way using either semitransparent mirrors at the end faces of the waveguide or a loop of single-mode fiber. The feedback can conveniently be combined with the mode field selection described above by combining the computer generated holograms or aperture with mirrors or feedback fiber loop.

Figure 5:
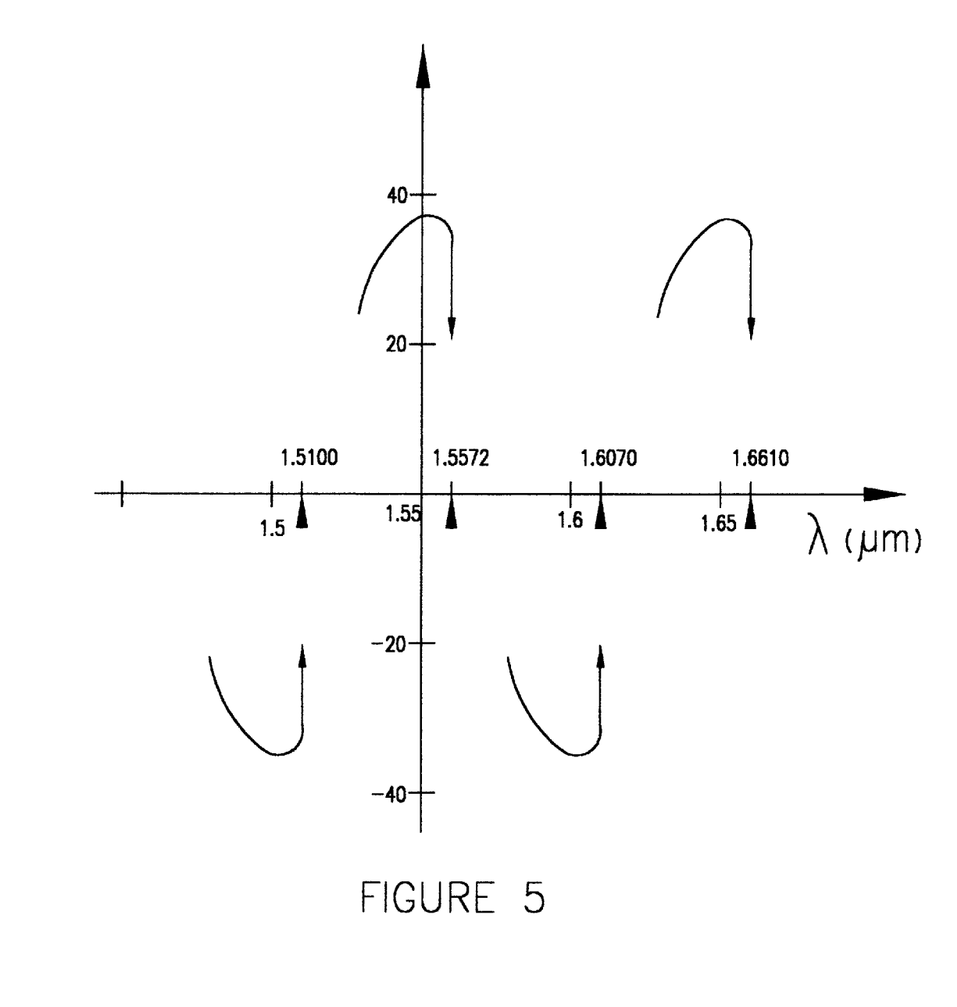
FIG. 5 shows the dependence of the normalized amplitude of the central mode peak on the wavelength.
Figure 6:
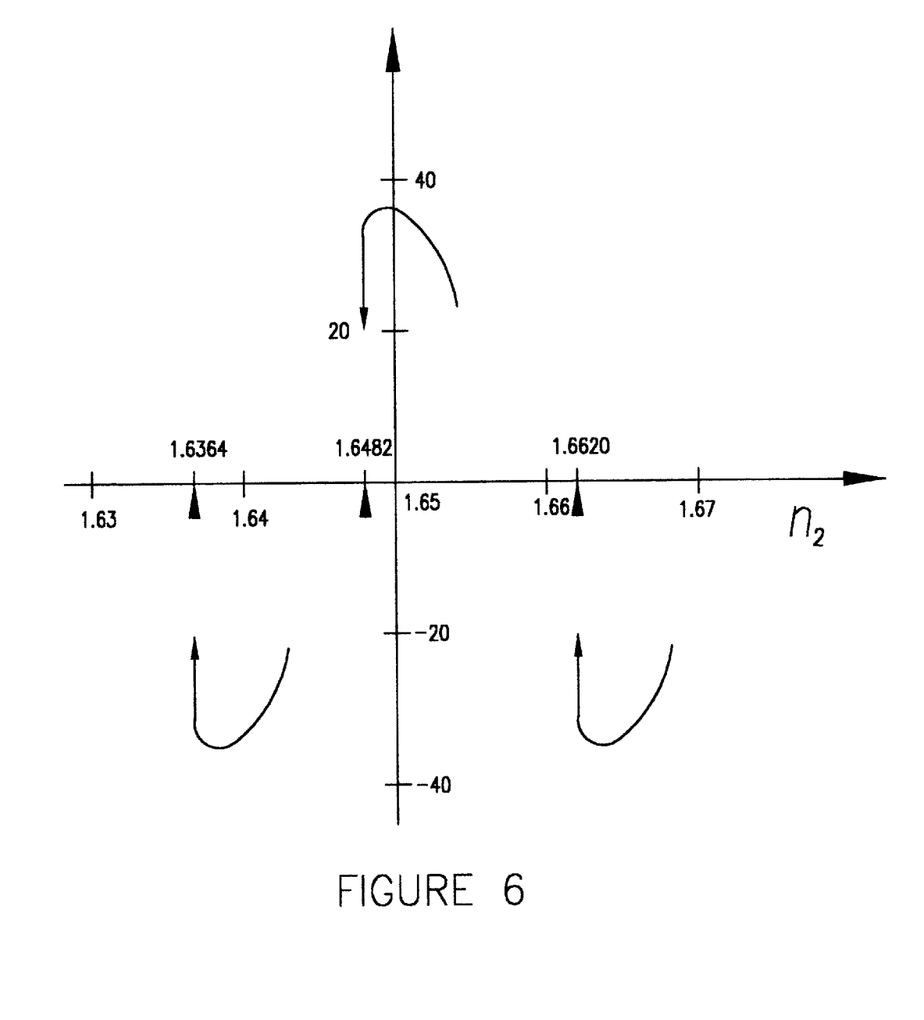
FIG. 6 shows the dependence of the normalized amplitude of the central mode peak on the core refractive index $n_2$.

The conditions, under which the mode with sharp central peak of its field appears, depend on the waveguide profile parameters and the wavelength $\lambda$. Changing the wavelength results in a periodic construction and destruction of the mode structure with sharp central peak each time when whole number of guided modes in the waveguide increases by one. The normalized amplitude of the peak of the mode field in the waveguide center as a function of wavelength is represented in FIG. 5. The figure shows periodic dependence of the system transmission as a function of wavelength. Thus, the laser being tuned to an appropriate working point can also operate as a narrow band filter. For example, the cutoff of the filter bands represented in FIG. 5 correspond to the wavelengths $\lambda$=1510.0 nm, 1557.2 nm, 1607.0 nm, 1661.0 nm, etc. and increasing the wavelength at these points as small as 0.1 nm results in drastic decreasing of the central peak of the mode field. The wavelength selectivity of the field configuration with sharp central peak provides a possibility of reduction of the spontaneous emission noise. That is another advantage of the laser proposed.

The amplitude of the central peak of the mode field has also the similar periodic dependence on both waveguide core refractive index $n_2$ and waveguide thickness $d_2$. The normalized amplitude of the central peak of the waveguide mode as a function of refractive index $n_2$ is represented in FIG. 5. The dependence of the intensity of the output beam resulting from the selected central peak on the core refractive index $n_2$ can be used to design a laser with modulated Q-factor (factor-of-merit). The amplitude of the peak of the output beam breaks down in the points of cutoff corresponding to the refractive index $n_{2cut}$=1.6364, 1.6482, 1.6620, etc. if the index is decreased by the value as small as $10^{-4}$–$10^{-5}$. Thus, electro-optic, acousto-optic, thermo-optic effects or $\chi^{(3)}$-nonlinearity of core material can be used for such a modulation.

In one preferred embodiment of pulsed waveguide laser with modulated Q-factor a working point should be tuned to corresponding refractive index $n_{2cut}$, but remain below this value. Under such conditions the intensity of the field peak passing through an output aperture is very small and the laser is not able to generate light beam providing, thus, conditions for effective pump of its active medium. The core refractive index increases with the inversion of population resulting in increasing the intensity of the output beam peak used also as a feedback. Therefore the laser begins to generate. As the result of laser generation the inversion of population decreases resulting also in decreasing of the core refractive index and break down on the generation. The laser generates a sequence of short intensive pulses.

The described method of modulation of Q-factor can also be useful for design of powerful pulsed waveguide lasers with synchronization of longitudinal modes employing the same mode synchronization technique as have been developed for standard lasers. For example, in one preferred embodiment of a pulsed waveguide laser with synchronization of longitudinal modes one should only adjust length L of the active waveguide in such a way that time interval between two consequently generated pulses is just equal to 2L n/c, where c is the velocity of light and n is average refractive index of the waveguide core.

Figure 7A:
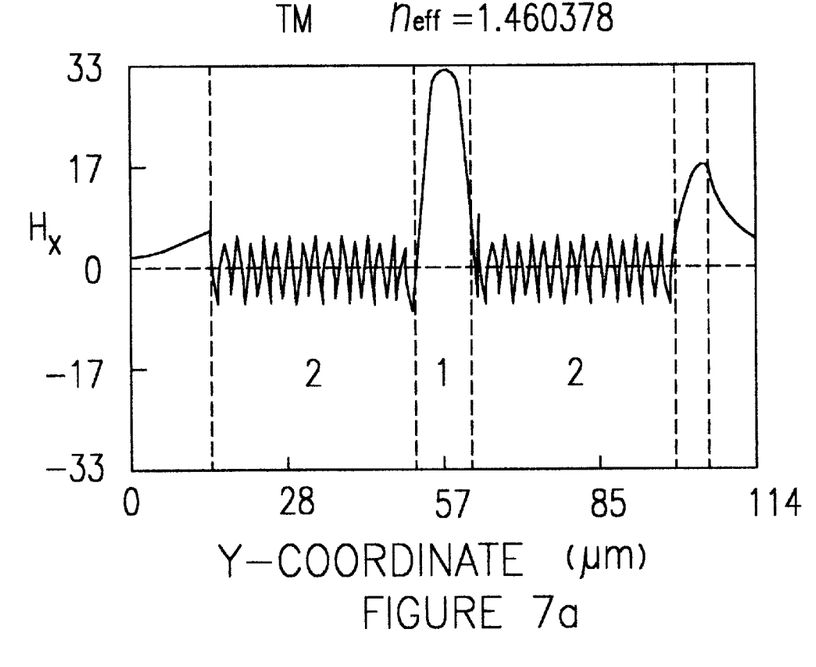
FIG. 7(a) shows a typical configuration of the mode field having one sharp central peak and one sharp side peak.
Figure 7B:
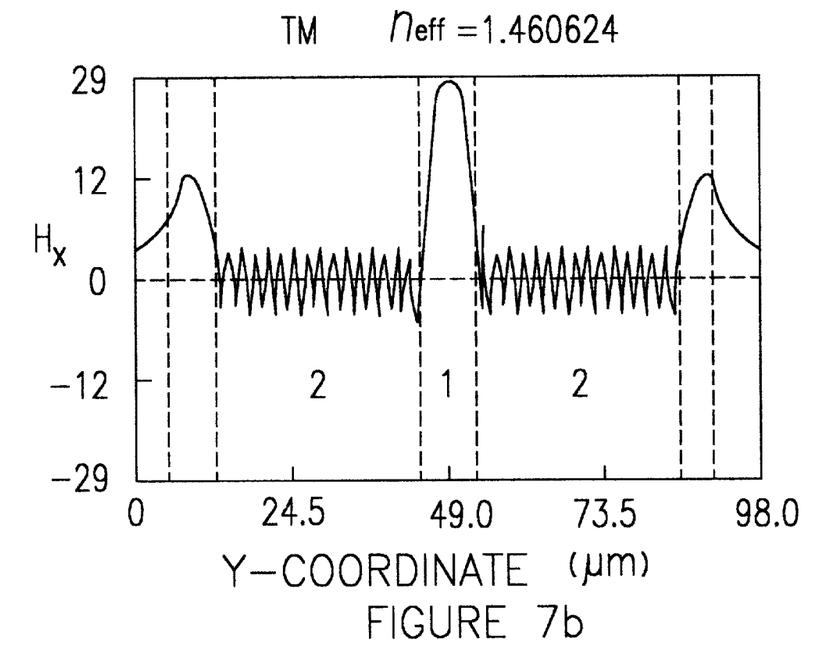
FIG. 7(b) shows a typical configuration of the mode field having one sharp central peak and two sharp side peaks.

The described properties of higher order waveguide mode can also be used to design another type of waveguide laser having passive core but active cladding pumped with an external source. We have found out that adding to the waveguide core an outer lower refractive index optical layer at least from one side of the core results in a higher order mode having both the sharp central peak and sharp side peak in its field distribution FIG. 7(a) shows such a mode field having one additional side peak, while FIG. 7(b) illustrates the similar mode having two side peaks in the case of a symmetrical waveguide with two outer lower index layers. Both modes shown in FIG. 7 correspond to the case when $n_{cl}$=1.46, $n_1$=1.463, $n_2$=1.65, $n_3$=1.463, $d_1$=8 $\mu$m, $d_2$=30 $\mu$m, $d_3$=5 $\mu$m and $\lambda$=1.55 $\mu$m. Such mode configurations in multimode waveguide can be employed to enhance output power in lasers and amplifiers with active cladding since the mode field under consideration has a sharp peak in cladding region instead of exponentially evanescent field in the case of standard lasers of such a type.

Applying the physical principles of this invention to different types of active waveguides results in different types of waveguide lasers. For example, one can realize in such a way optical fiber lasers, micro-lasers in integrated optics based on planar or rib active waveguides, semiconductor lasers based on quantum well structure using standard methods for pumping these waveguides. In the case of semiconductor lasers its tuning to appropriate working point can conveniently be performed by adjusting the laser pump current.

Having described preferred embodiments of the invention with reference to the accompanying drawings, it is to be understood that the invention is not limited to the precise embodiments, and that various chances and modifications may be effected therein by skilled in the art without departing from the scope or spirit of the invention as defined in the appended claims.

I claim:

1. An enhanced power waveguide laser operating at a preselected wavelength comprising:

an active multimode optical waveguide having a compound core of an active medium and a cladding of lower index;

said compound core having a width and a refractive index profile;

said compound core having a preselected dip of its refractive index profile in a central region of known width in said core such that a higher order mode propagating in said waveguide has a sharp peak of its energy field in said central region of said compound core with a major portion of said energy of said higher order mode confined to said central region of said core;

said active medium being capable of being pumped by an external power source;

a means of providing feedback conditions for higher order modes within said waveguide such that only one single transverse higher order mode having a sharp peak of its energy field in said central region of said core and having said preselected wavelength is generated and amplified;

wherein said refractive index profile of said compound core is designed to propagate said one transverse higher order mode, and said refractive index profile of said compound core has a step index profile with said central dip; and wherein said laser has a Q-factor.

2. An enhanced power waveguide laser according to claim 1, operating in a pulsed mode, wherein said laser has a means for Q-switching, said means being dependent on changes in said active medium's refractive index due to population inversion during pumping and having selected said refractive index profile for said compound core such that small variations in said core's refractive index during pumping increase said selected higher order mode's peak energy in said central region thereby causing lasing and subsequent reduction of said population inversion and switching off of said laser.

3. An enhanced power waveguide laser according to claim 1 wherein modulating said Q-factor at a frequency of c/2nL, where c is the velocity of light, n is an average refractive index of said waveguide core and L is length of said active waveguide, provides synchronization of longitudinal laser modes.

4. An enhanced power waveguide laser according to claim 1 wherein said active multimode waveguide is an optical fiber doped with appropriate rare-earth elements.

5. An enhanced power optical fiber laser according to claim 4 wherein said one transverse higher order mode has a width and said width is matched to a width of a fundamental mode of a single mode fiber network connected to an output end of said active waveguide.

6. An enhanced power waveguide laser according to claim 1 wherein said active multimode waveguide is a planar or rib integrated optical waveguide doped with appropriate rare-earth elements.

7. An enhanced power integrated optical laser according to claim 6 wherein said one transverse higher order mode has a width and said width is matched to a width of a fundamental mode of a single mode fiber network connected to an output end of said active waveguide.

8. An enhanced power waveguide laser according to claim 1 wherein said active multimode waveguide is an active waveguide in a plane of a p-n junction of a semiconductor laser.

9. An enhanced power semiconductor laser according to claim 8 wherein said one transverse higher order mode has a width and said width is matched to a width of a fundamental mode of a single mode fiber network connected to an output end of said active waveguide.

10. An active multimode optical waveguide comprising:

a compound core of an active medium;

said compound core having a width and a refractive index profile;

a cladding of lower index;

said compound core having a preselected dip of its refractive index profile in a central region of known width in said core such that a higher order mode propagating in said waveguide has a sharp peak of its energy field in said central region of said compound core with a major portion of said energy of said higher order mode confined to said central region of said core; and wherein said refractive index profile of said compound core has a step index profile with said central dip.

* * * * *